United States Patent [19]

Lee

[11] 4,353,206
[45] Oct. 12, 1982

[54] APPARATUS FOR REMOVING NOX AND FOR PROVIDING BETTER PLANT EFFICIENCY IN COMBINED CYCLE PLANTS

[75] Inventor: Richard M. Lee, Media, Pa.

[73] Assignee: Westinghouse Electric Corp., Pittsburgh, Pa.

[21] Appl. No.: 179,867

[22] Filed: Aug. 20, 1980

[51] Int. Cl.³ ............................................... F02C 6/18
[52] U.S. Cl. .................................. 60/39.18 B; 122/7 B
[58] Field of Search ........................ 60/39.18 B, 39.5; 122/7 R, 7 B

[56] References Cited

U.S. PATENT DOCUMENTS

| | | | |
|---|---|---|---|
| 3,900,554 | 8/1975 | Lyon ...................................... | 423/235 |
| 4,106,286 | 8/1978 | Sakai et al. ............................. | 60/39.5 |
| 4,160,805 | 7/1979 | Inaba et al. ............................ | 60/39.18 B |

FOREIGN PATENT DOCUMENTS 55-114826 9/1980 Japan .............................. 60/39.18 B

OTHER PUBLICATIONS

Atsukawa et al. "Development of NOx Removal Processes with Catalyst for Stationary Combustion Facilities". MTB 124, May, 1977.
Hishinumo et al. "NOx Removal Process by Injection of NH₃ and H₂O₂ in Gas Turbine Exhaust Gas", ASME 79-GT-69, Mar. 1979.
Saleen et al. "Hitachi Zosen NENOx Process for Fossil Fuel Fired Boilers".

Primary Examiner—Louis J. Casaregola
Attorney, Agent, or Firm—E. F. Possessky

[57] ABSTRACT

In a combined cycle power plant having one or more combustion turbines and a steam turbine, a dry catalytic NOx removal module is disposed in each of the turbine exhaust stacks. A waste heat exchanger system includes an economizer coil and a pair of high pressure evaporator coils on upstream and downstream sides of the NOx removal module to generate steam for injection into the turbine combustors and for delivery to a superheater coil upstream from the upstream evaporator coil. A bypass stack across the upstream evaporator coil is damper controlled to regulate the exhaust gas temperature at the entry to the NOx removal module. A downstream low pressure evaporator coil generates steam for induction into the low pressure section of the steam turbine. Superheated steam is supplied to the high pressure section of the steam turbine. The compressor inlet guide vanes are closed to increase exhaust gas temperature as required after the upstream evaporator bypass flow reaches zero and no longer controls gas temperature. If the inlet guide vanes reach the fully closed position, reductant injection flow is shut off to terminate the NOx removal process under low exhaust gas temperature conditions. A plant afterburner is operated to add heat to the exhaust gas if gas temperature is too low.

2 Claims, 3 Drawing Figures

APPARATUS FOR REMOVING NOX AND FOR PROVIDING BETTER PLANT EFFICIENCY IN COMBINED CYCLE PLANTS

CROSS-REFERENCE TO RELATED APPLICATIONS

Ser. No. 188,052 filed Aug. 20, 1980.

BACKGROUND OF THE INVENTION

The present invention relates to a system apparatus for removing nitrogen oxides (NOx) from combustion turbine exhaust gases and more particularly to apparatus for removing NOx from combustion turbine exhaust gas at exhaust gas temperature conditions existing in a combined cycle power plant with a waste heat recovery arrangement preceding the steam cycle portion.

In the operation of combustion turbines, NOx originates from nitrogenous compounds in the fuel used and from atmospheric nitrogen fixation during combustion. Natural gas is a relatively clean fuel from the standpoint of fuel bound NOx, but coal and oil can vary significantly in NOx content.

It is necessary for environment control that the plant be operated so that the combustion process is conducted without excessive NOx emissions and/or that the combustion exhaust gas be processed to remove NOx to less than allowable limits. It is desirable that NOx emission control be provided with little or no cost in plant operating efficiency.

Although some turbine combustion processes may be conducted with NOx emissions within allowed limits, there is a need for post-combustion NOx removal in many current design combustion turbines as well as many past turbine installations. Where the flame temperature must be reduced to the point where plant efficiency is unacceptable in order to bring the combustion process within NOx emission limits, there is in fact a requirement for a NOx removal system.

One prior art arrangement for dry catalytic removal of NOx from boiler flue gases in a conventional steam power plant involves the injection of a reductant such as ammonia ($NH_3$) or carbon monoxide (CO) etc. into the exhaust gas. After catalyzed chemical reaction, NOx is converted into nitrogen ($N_2$) and water ($H_2O$).

For the NOx removal process to be effective in the dry catalytic removal system, the exhaust temperature typically must be within a determinable temperature range, i.e. within 610° F. to 810° F. in one presently available NOx removal system which uses $NH_3$ as a reductant. Above 810° F., $NH_3$ detrimentally begins to cause additional NOx generation and below 610° F. it detrimentally scavenges for SOx to form ammonium sulfate and ammonia bisulfate.

Another known kind of NOx removal process involves injection of $NH_3$ and heavy water ($H_2O_2$) into the exhaust gas from a combustion turbine. This wet process is described more fully in an ASME publication entitled NOx Removal Process by Injection of $NH_3$ and $H_2O_2$ in Gas Turbine Exhaust Gas and presented by Hitachi Ltd. personnel at the San Diego Gas Turbine Conference on Mar. 12-15, 1979.

Some background description on the dry type NOx removal process is set forth in (1) a publication entitled Development of NOx Removal Processes With Catalyst for Stationary Combustion Facilities and published by Mitsubishi Heavy Industry in a May 1977 Mitsubishi Technical Bulletin Number 124 and (2) another publication entitled Hitachi Zosen DeNOx Process For Fossil Fuel Fired Boilers presented by personnel of Hitachi and Chemico Air Pollution Control Corporation on Nov. 1978 at Westinghouse, Eddystone, PA. In the latter publication, some consideration is given to temperature control of boiler exhaust gas in the conventional steam plant application of the dry NOx removal process.

In the known proposals for combustion turbine application of the dry NOx catalytic removal systems, a NOx removal module is installed so that exhaust gas is mixed with cooler ambient air if it is too hot or with hot by-passed combustion gas if it is too cool to produce a gas mix at optimum temperature or at least within the required temperature range.

While NOx is removed from exhaust gas in the known related prior art, energy is consumed in providing for the NOx removal, as by gas mixing to regulate the exhaust gas temperature within range in the dry catalytic system. Energy consumption for NOx removal can reduce plant efficiency significantly.

In the cited copending application, a new system is disclosed for implementing a NOx removal process in a combustion turbine plant. The present application is directed to the implementation of a NOx removal process in the specific case of a combined cycle power plant which includes at least one combustion turbine. It is desirable that NOx removal in a combined cycle plant be both effective and efficient.

SUMMARY OF THE INVENTION

A combined cycle combustion turbine power plant includes a NOx removal system disposed in the path of exhaust gas from the plant combustion apparatus. Modulator evaporator coil means are provided for extracting heat from exhaust gas upstream from the NOx removal system, and bypass duct means are operated with it to control the temperature of the exhaust gas as it enters the NOx removal system to provide for efficient NOx removal and to generate steam efficiently from the extracted heat for injection into the combustion turbine combustors and/or for delivery to a superheat coil means upstream from the modulator evaporator coil means in the exhaust gas path.

DESCRIPTION OF THE PREFERRED EMBODIMENT

Figure 1:
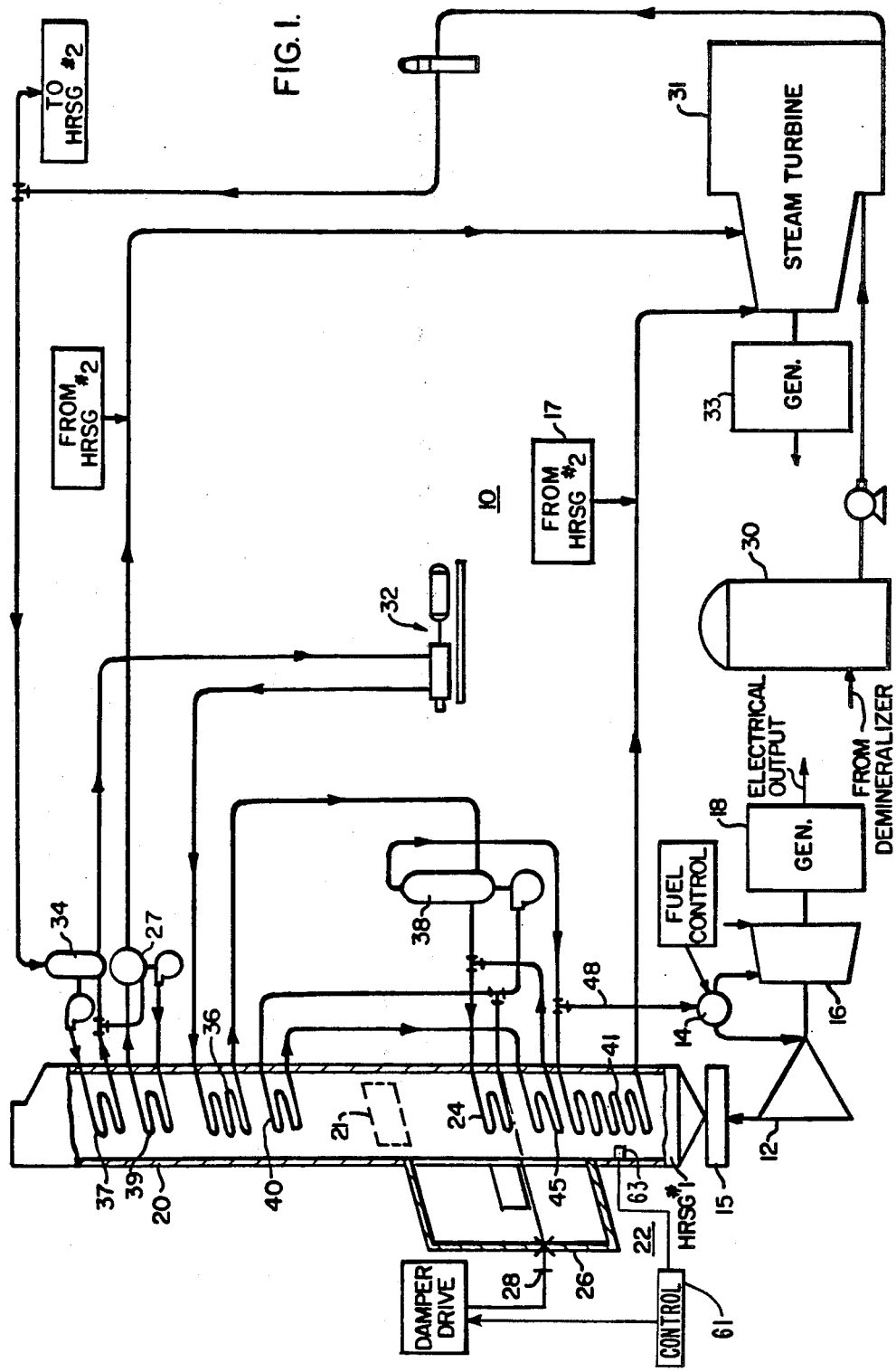
FIG. 1 shows a schematic view of a combined cycle power plant apparatus in which NOx is removed from exhaust combustion turbine gas in accordance with the principles of the invention.

More particularly, there is shown in FIG. 1 an electric power plant 10 in the form of a combined cycle power plant. A combustion turbine 12 employs combustors 14 which burn natural gas or oil or other suitable fossil fuel. A second combustion turbine-generator (not shown) is also provided in the plant to generate electricity and steam as described for the turbine 12 as indicated by the reference character 17.

The turbine 12 drives a compressor 16 to provide intake air which supports combustion in the combustors 14 and provides mass flow to drive the turbine blades. A generator 18 is driven by the turbine 12 to produce electric power.

Turbine exhaust gas is directed through an afterburner 15, for supplementary heating as required, and an exhaust duct 20 to a stack for discharge to the atmosphere.

Emission standards such as California ARB Rule 475.1 for nitrogen oxides (NOx) are strict and NOx emissions from combustion turbines and other combustion devices must be reduced accordingly for the apparatus to be usable at the locations where the emission limits apply. Conventional boiler flue gas may typically be about 650° F. The NOx removal process employed in the exhaust gas accordingly must be suitable and effective for the conditions of the exhaust gas in the particular plant.

In this case, it is preferred that a commercially available dry catalytic NOx removal system 21 be employed to remove NOx from the turbine exhaust gas. A suitable system is one provided by Chemico Air Pollution Control under license from Hitachi Ltd. and operating in accordance with a process known as the Hitachi-Zosen Dry Catalytic De-Nox Process.

As previously indicated herein, the effectiveness of the dry catalytic NOx removal system 21 is dependent on the exhaust gas temperature. A heat recovery and bypass duct arrangement 22 is disposed in the exhaust duct 20 to provide waste energy recapture for the generation of steam which drives a steam turbine 31 and another electric generator 33, for the development of steam for injection into the combustion turbine combustors and for exhaust gas temperature control which enables efficient NOx removal.

Basically, exhaust gas temperature at the entry point to the NOx removal system 21 is regulated by the amount of exhaust gas flow through a heat recovery modulating evaporator coil 24 and the amount of exhaust gas flow through a bypass duct 26 which diverts gas around the coil 24 to the entry to the NOx removal system 21. As more gas is diverted through the bypass duct 26 under the control of a motor operated damper 28, less gas passes through the evaporator coil 24, less heat is removed and the temperature of the remixed bypass flow and the main duct flow at the entry to the NOx removal system 21 is reduced, less from the temperature of the main flow before by-pass. At less exhaust gas is diverted through the bypass duct 26, the opposite occurs.

Damper 28 is the sliding door type. It slides in and out of duct 20 and by-pass duct 26 such that when the by-pass is fully open, the main duct is fully closed and vice versa. To prevent leakage, proper sealing is provided at the point of entry where the damper 28 enters the main duct.

The heat recovery system 22 further includes a feedwater storage tank 30 which is supplied from a demineralizer. A feedwater pump 32 drives feedwater to an economizer coil 36 from the tank 30 and a deaerator 34. The feedwater is heated in the economizer coil 36 in the downstream region of the exhaust duct 20 where the gas temperature is lower than it is at the duct entry point.

Hot feedwater flows from the economizer coil 36 to a high pressure steam drum 38 where it is directed both to an unbypassed evaporator coil 40 downstream from the NOx removal system 21 at to the gas temperature control or modulating evaporator coil 24. Flow from the downstream evaporator coil 40 is directed to another unbypassed evaporator coil 45 located upstream from the modulating evaporator coil 24.

Generated high pressure steam is returned to the drum 46 from the two coils 24 and 25 where it is available for delivery to superheat coil 41 upstream from the modulating evaporator 24 and the coil 45. Generated super-heated steam drives the steam turbine 31.

In this case, it is preferred that steam also be used as a supply for conventional steam injection into the turbine combustors 14 as indicated by steam pipe 48.

COMBINED CYCLE PLANT—BACKGROUND SYSTEM INFORMATION

The combined cycle plant 12 in this case is a plant supplied by Westinghouse Electric Corporation and similar to the one known in the trade as a PACE power plant. To provide a fuller understanding of the invention and its implementation in a combined cycle power plant, additional general background description will now be presented herein.

The combustion turbine unit is basically a W501D frame which is a performance improved W501. This single shaft two bearing unit consists of a 19 stage high efficiency axial compressor, a combustion chamber equipped with 16 combustors 14 arranged in a circular array around the machine axis, and a four stage reaction type turbine. The combustion turbine 12 is directly coupled to and drives the generator 18.

The exhaust gas from the turbine 12 passes through the exhaust diffuser and axial exhaust manifold into the heat recovery boiler 22.

In the heat recovery boiler 22, the energy in the exhaust gas is recovered to generate superheated steam for the steam turbine and saturated steam for injection to the combustors 14 and produce low pressure steam in the low pressure boiler 39 for induction to the low pressure section of the steam turbine 31. Part of the energy recovery takes place in the economizer coil 36 and in low pressure coils 37. Part of the hot water from the low pressure economizer is used for feed heating. The major component coils are:

1. Low pressure evaporator 39—generation of low pressure steam for use in the low pressure section of the steam turbine by induction. It consists of one bank welded into a header at the top and a header at the bottom.

2. HP Economizer 36—heating of condensate to saturation temperature of the high pressure steam drum. The economizer section consists of one bank welded into a header at the bottom and a header at the top. One header is connected by welded pipe to the high pressure drum and the feedwater control valve. The other is connected through welded pipe to the boiler feed pump 32.

3. Evaporators 40, 24, 45—generation of high pressure steam. This section consists of one bank welded into a header at the top and a header at the bottom. Each of these headers is fixed but the return U bends of each serpentine are free to float. The modulating coil 24 generates saturated high pressure steam.

4. Superheater 41—heat is extracted from the exhaust gas and transferred to steam from the high pressure steam drum 38. The superheating section consists of two banks welded into headers, one header is connected by welded pipe to the drum while the outlet header is free to float for thermal expansion.

5. Low pressure economizer 37—this system further utilizes the energy in the exhaust gas by preheating the feedwater and minimizes the stack temperature. Feedwater to the system also comes from the deaerator 34 upstream of the boiler feed pump 32. It is heated to the saturation temperature of the low pressure induction steam. Low pressure saturated steam is then generated in the low pressure evaporator section 39 and sent to a low pressure steam drum 27. Its design is similar to that of the high pressure section.

The steam turbine 31 is a condensing, non-reheat, single casing, single flow, axial exhaust unit with a standard low pressure last row blade and running at a speed of 3600 rpm. It operates under an inlet steam condition of 1130 psia and 930° F. exhausting to 2.5″ Hg absolute pressure with one stage of feedwater heating. The machine contains 10 stages of Rateau blading and three stages of reaction blading.

NOx REMOVAL

Figure 3:
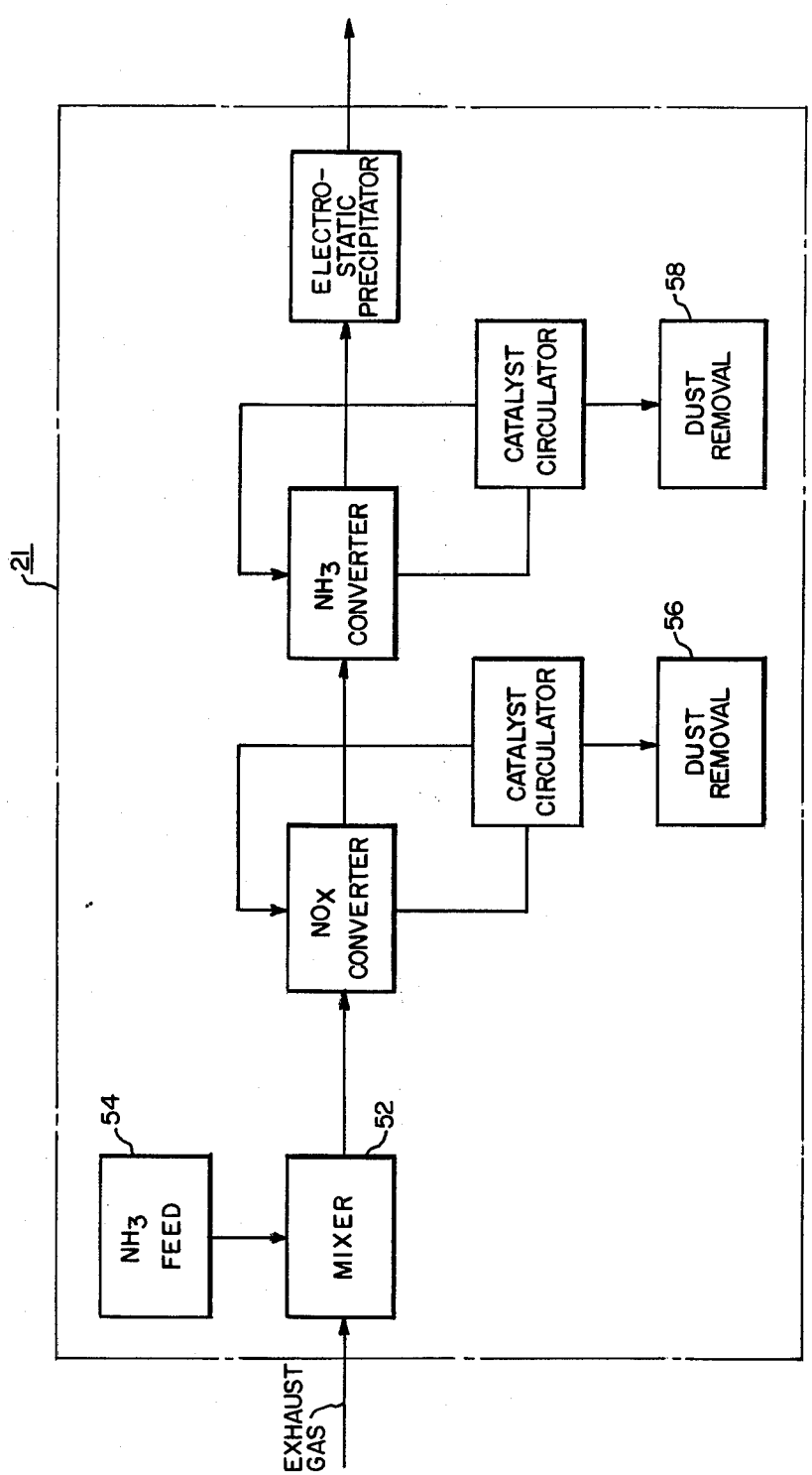
FIG. 3 shows a schematic block diagram of a typical commercially available NOx removal system for the power plant of FIGS. 1 and 2.

The NOx removal system 21 is shown in greater functional block detail in FIG. 3 to provide a fuller understanding of the invention.

Nitrogen oxides in fossil fuel combustion boilers originate from nitrogenous compounds in the fuel and from atmospheric fixation during combustion. As already indicated, some reduction of NOx in exhaust gas can be achieved through combustion modification, by steam or water injection. Where combustion modification procedures fail to reduce NOx emissions below limits, exhaust NOx removal procedures are needed and catalytic reduction has been found to be successful in melting NOx removal requirements in various boiler applications. Mixing of exhaust gases with a suitable reducing agent is followed by contact with a solid catalyst surface which selectively adsorbs nitrogen oxides and the reducing agent. The adsorbed components undergo a chemical reaction on the catalyst surface and the reaction products are desorbed. A variety of catalysts have been developed: the preferred reducing agent for nitrogen oxides is ammonia.

Ammonia reduces nitrogen oxides into nitrogen and water. In the Hitachi-Zosen process, NOx removal is temperature dependent as previously described herein. The following formulas define the denitrification reactions which apparently occur during operation of the NOx removal process:

$$4NO + 4NH_3 + O_2 \rightarrow 4N_2 + 6H_2O \quad (1)$$

$$6NO + 4NH_3 \rightarrow 5N_2 + 6H_2O \quad (2)$$

$$2NO_2 + 4NH_3 + O_2 \rightarrow 3N_2 + 6H_2O \quad (3)$$

$$6NO_2 + 8NH_3 \rightarrow 7N_2 + 12H_2O \quad (4)$$

$$4NH_3 + 3O_2 \rightarrow 2N_2 + 6H_2O \quad (5)$$

In the NOx removal system 21 (FIG. 3), exhaust gas preferably in the temperature range of 610° F. to 810° F. is mixed in block 52 with gaseous ammonia (approximately equi-molar ratio) which is injected into the exhaust flow from a liquid ammonia storage tank as indicated by the reference character 54. The gaseous ammonia is preferably diluted with air before injection, and a network of nozzles may be employed to achieve uniform mixing of NH3 and exhaust gas. The gas mix is then passed through a fixed bed catalyst reactor where nitrogen oxides are reduced by ammonia to nitrogen and water over the catalyst surface. Two basic controls are needed for best denitrification.

Reactor temperature control has been provided in the prior art by an auxiliary furnace at low loads. At higher loads in steam turbine plants, it has been suggested that gas temperature control be provided by an economizer bypass duct or through economizer water flow control.

Ammonia feed control can be provided by measuring gas throughput and NOx concentration. Both NOx and ammonia can be monitored in the stack to provide additional signals for adjusting ammonia feed.

As pointed out in the aforementioned copending application, exhaust gas temperature control in combustion turbine plants has been limited to the mixing of ambient air with the exhaust gas for cooling and the mixing of hot combustor outlet air with the exhaust gas for heating. No prior art implementation of NOx removal is known to have been made in combined cycle plants.

The Hitachi-Zosen catalyst reactor typically is fabricated with sheet metal as a block having a honeycomb geometry. A number of honeycomb blocks can be installed in the exhaust duct to provide the needed catalyst reactor volume.

In addition to gas temperature and ammonia injection flow and reactor geometry, NOx removal also requires the presence of some oxygen in the exhaust gas. Moisture in the exhaust gas causes a small decrease in catalyst activity.

NOx concentration has no effect on the catalytic reaction if a stoichiometric ammonia flow is maintained. Dust can adhere to or abrade the catalyst surface and thereby affect catalyst performance. Dust effects are minimized by reactor design and by use of suitable blowers 56 and 58 (FIG. 3).

SYSTEM OPERATION

Figure 2:
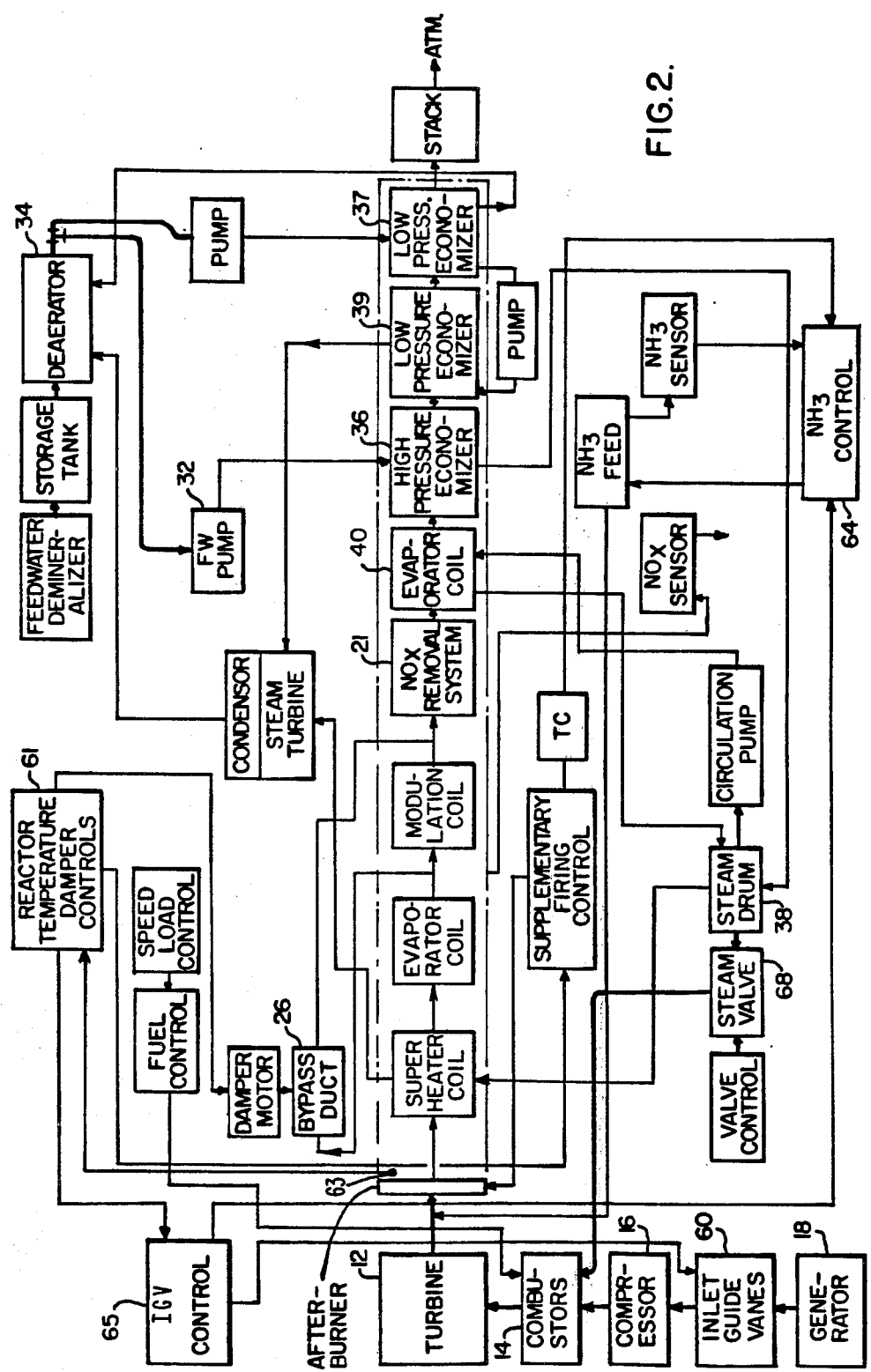
FIG. 2 shows a schematic block diagram of the plant of FIG. 1 with some portions illustrated in greater detail.

In FIG. 2, the system is shown in greater functional block detail. Identical elements in FIGS. 1 and 2 have been assigned identical reference characters.

Exhaust gas temperature is kept at optimum for maximum NOx removal efficiency and minimum NH3 concentration by varying the heat removal from the gas stream by the high pressure modulator evaporator coil 24. The bypass stack 26 is provided across the modulating coil 24. At design point, the bypass damper 28 is completely shut and steam generation in the modulating coil 24 is at its maximum.

At part load, part of the exhaust gas downstream of the high pressure evaporator coil 45 reaches the bypass duct 26 to bypass the modulating coil 24 upstream of the NOx removal system 21. The amount of bypass gas is controlled by a temperature sensor 63 which controls the bypass damper opening through control 61. The bypass is total when the optimum gas temperature is reached. At that time, no steam is produced in the modulating coil 24.

As noted, the optimum reaction temperature is between 610° F.-810° F. with maximum NOx removal efficiency at 770° F. Above 810° F., NH3 starts to generate NOx. Below 610° F., NH3 scavenges for SOx to form ammonium sulfate and bisulfate. Thus, reaction temperature outside of this 200° F. range is detrimental. For successful operation of the system throughout part load and high or low ambient conditions, the following measures are preferably used in conjunction with the reaction temperature modulating-steam generating coil 24 and the bypass stack 26:

1. Modulate the compressor inlet guide vane to vary combustion turbine exhaust temperature and gas flow.
2. Limit part load operation to no lower than about 25% load.
3. Shut off NH3 feed temporarily at both ends of the gas temperature range.
4. Supplementary firing by the afterburner 15 at too low an exhaust temperature.
5. Bypass exhaust gas at the high temperature end (e.g. under high ambient).
6. Water wash the heat exchangers periodically to clean deposits.

With such procedures, the system is viable for heat recovery boilers with either horizontal or vertical gas flow configurations.

The basic element of the exhaust gas clean-up system may be either the Hitachi-Zosen nox-non system, Mitsubishi Heavy Industry process or any other equivalent NOx removal system and the reductant can be NH3 or any other suitable chemical such as CO. Further, unlike other schemes where the nox-non modules are installed either separate from the combustion turbine exhaust stack and the hot exhaust gas is mixed with the cooler ambient air to give optimum reaction temperature or the cooler exhaust gas is mixed with some hot combustion turbine gas through a bypass arrangement to provide the optimum reaction temperature at the expense of energy, a full recovery of the exhaust energy is provided by the present invention by allowing a minimum stack temperature slightly above the dew point for acid formation at the low temperature end.

A low pressure economizer aids in feedwater heating and low pressure dry saturated steam is generated for induction into the steam turbine to produce additional power. Thus, higher stack temperatures of the combined cycle prior art is reduced by the low pressure economizer-evaporator coils employed in the present invention to generate an increased amount of low pressure steam of higher pressure level.

Turbine exhaust temperature is increased when further increase is needed and the bypass duct 26 is fully closed; thus, when the temperature sensor signal indicates an exhaust gas temperature below desired value and the damper 28 is closed, a conventional IGV control 65 closes compressor inlet guide vanes 60. When the gas temperature reaches the lower end of optimum reaction temperature (say 600° F.) with fully closed inlet guide vanes 60, the minimum part load operation point is established. Lower part load operation takes place with the reductant (e.g. NH3) feed shut off by conventional NH3 flow control 64, or supplementary firing needs to be instituted.

Since the injected steam is lost in the stack, 100 percent make-up water is necessary. To this end, water from demineralizer is pumped to the deaerator (via the storage tank) and feedwater heating is accomplished by recirculation of hot water from the low pressure economizer.

If desired, the various controls can be conventional units which are interfaced with suitable logic and actuation circuitry which effectuates the described system operation. Thus, damper controls 61, IGV control 65 and ammonia feed control 64 are conventional units with interfacing circuitry which causes:

(1) position control of the bypass damper 28 as described under the control of the temperature sensor 63;

(2) initiation of IGV operation for exhaust gas temperature control under the control of the temperature sensor 63; and (3) shutoff of the NH3 feed by the control 64 when the inlet guide means are fully closed and temperature sensor 63 reads below 600° F.

(4) turn on the supplementary firing to increase gas temperature if desired.

Steam producd in the drum 38 is supplied to the combustors 14 through valve 68. Valve control 70 conventionally regulates steam injection on the basis of steam/fuel ratio and the combustor shell pressure limit.

The system can employ a low sulfur oil using the described NOx removal process with an intermittent moving bed converter and NH3 as a reductant. High sulfur oil can also be employed, but the exhaust gas would be dirtier, and SOx removal means would need to be incorporated to meet emission rules. The following conditions apply:

1. NOx removal efficiency is estimated at 85–90% with no difficulty in meeting mist emission standards. Under extremely stringent conditions, steam injection may be used for additional NOx emission control.
2. Unreacted NH3 is decomposed into N2 and H2O to avoid poisoning discharge and further improve the NOx removing efficiency.
3. SOx emission is minimum and controlled by the sulfur contained in fuel specifications.
4. Particulates contained in products of combustion from low sulfur oil burner are small and present no problem.
5. Pressure drop due to dust clogging in the converter is negligible and further protected against by intermittent moving of catalyst in bed.
6. NH3—SOx compound deposition in heat exchanger downstream of the NOx removal converter is best handled by periodic water washing.
7. Reaction temperature is maintained at about 660° F. to 750° F. for high NOx removal efficiency and low NH3 concentration at the outlet.

In a combined cycle plant, injection of steam increases power output at the expense of heat rate since the exhaust heat from the combustion turbine is normally already fully recovered and the latent heat of vaporization of the steam is lost up the stack. In the present case, the presence of the basic temperature controlled NOx removal system has minimal effect on plant performance since the converters require no heat and introduce negligible pressure loss. The fact that required NOx reduction can be achieved without steam injection directly improves the heat rate to that of no injection (see Table 1). It also permits the operation of W501D engine in areas with low allowable NOx level.

| SAMPLE COMBINED PLANT RELATIVE PERFORMANCE | | |
| --- | --- | --- |
| STEAM INJECTION | NO | YES |
| Plant Heat Rate-% | 100. | 101.1 |
| Net Plant Power-% | 100. | 103.7 |
| ST Net Power/ CT Net Power-Ratio | 0.50 | 0.43 |
| Stack Temp. | Minimum | Minimum |

In summary, the heat recovery steam generation system disclosed herein controls the exhaust gas temperature to provide for an optimum reaction exhaust gas temperature throughout the load range with an accompanying high overall combined cycle plant efficiency.

Although the system described here contains a non-reheat steam cycle, and the location of the NOx removal system is amid the high pressure evaporator coils, the same modulating evaporator-damper by-pass arrangement is applicable to a reheat steam cycle and they may be placed elsewhere in the exhaust stack to satisfy the optimum reaction temperature required by any NOx removal system other than the Hitach-Zosen system shown herein.

What is claimed is:

1. Apparatus for recovering heat energy and for removing NOx from the exhaust combustion gas in a combined cycle power plant having a turbine exhaust gas duct means, said apparatus comprising NOx removal means disposed in said duct means for mixing a reductant with the exhaust gas and for generating a catalytic reaction which removes NOx from the exhaust gas within a predetermined gas temperature range, a waste heat recovery system including an economizer coil disposed in said duct means downstream from said NOx removal means and a feedwater supply system for said economizer coil, a steam drum supplied by said economizer coil, a modulating evaporator coil disposed upstream from said NOx removing means and receiving flow from said steam drum, respective evaporator coils disposed downstream and upstream from said NOx removing means and coupled in series to receive flow from said steam drum, said evaporator coils supplying steam to said steam drum, a superheat coil disposed upstream from said evaporator coils, means for sensing exhaust gas temperature upstream from said NOx removing means, a by-pass stack disposed across said modulating evaporator coil, movable damper means for diverting exhaust gas flow from said duct means through said by-pass stack, means for positioning said damper means in response to said gas temperature sensing means to hold the exhaust gas temperature within the desired NOx removal range, means for directing steam from said steam drum to the combustion turbine for combustor injection, and means for directing steam from said steam drum to said superheat coil to generate superheated steam for use in driving a steam turbine in the combined cycle plant.

2. Apparatus as set forth in claim 1 wherein means are provided for controlling the firing level of supplementary firing means to raise the exhaust gas temperature above a desired value within the NOx removal temperature range.

* * * * *